United States Patent

[11] 3,593,336

| [72] | Inventor | Peter J. A. Turner<br>Glasgow, Scotland |
| --- | --- | --- |
| [21] | Appl. No. | 754,655 |
| [22] | Filed | Aug. 22, 1968 |
| [45] | Patented | July 13, 1971 |
| [73] | Assignee | Honeywell Inc.<br>Minneapolis, Minn. |
| [32] | Priority | Sept. 8, 1967 |
| [33] | | Great Britain |
| [31] | | 41128/67 |

[54] TANDEM CONTROL OF PROCESS CONTROLS SYSTEM HAVING TWO OR MORE CONTROL STATIONS
13 Claims, 4 Drawing Figs.

| [52] | U.S. Cl. | 340/187 |
| --- | --- | --- |
| [51] | Int. Cl. | G08c 21/00 |
| [50] | Field of Search | 340/187, 316, 317, 186, 315, 222, 182, 185, 184, 198, 163, 150, 155; 330/10, 9, 51 |

[56] References Cited
UNITED STATES PATENTS

| 2,689,339 | 9/1954 | Hornfeck | 340/187 |
| --- | --- | --- | --- |
| 2,949,273 | 8/1960 | Roder et al. | 340/187 |
| 3,290,563 | 12/1966 | Hyer et al. | 330/51 |

Primary Examiner—Donald J. Yusko
Assistant Examiner—Glen R. Swann, III
Attorneys—Arthur H. Swanson and Lockwood D. Burton ABSTRACT: A process control system having two or more control stations is shown wherein each control station generates a set point signal which is applied to a control device. The control device also receives a process variable signal that is compared to the set point signal for generating a characterized system output signal which automatically controls a load. Each control station includes an indicator to indicate the set point signal and a manual adjustment device to adjust the set point signal. Each control station connects to a servosystem within the other stations wherein adjustment of one control station set point signal adjusts the set point signal at each of the other control stations. Manual control of the load is achieved by a switch in each control station for removing the system output signal from the load and applying instead a manual control signal. Each control station is connected to a further servosystem within the other stations such that adjustment of manual control at one control station adjusts the manual control at each of the other control stations.

(LEFT HAND PART)

FIG.1. (LEFT HAND PART)
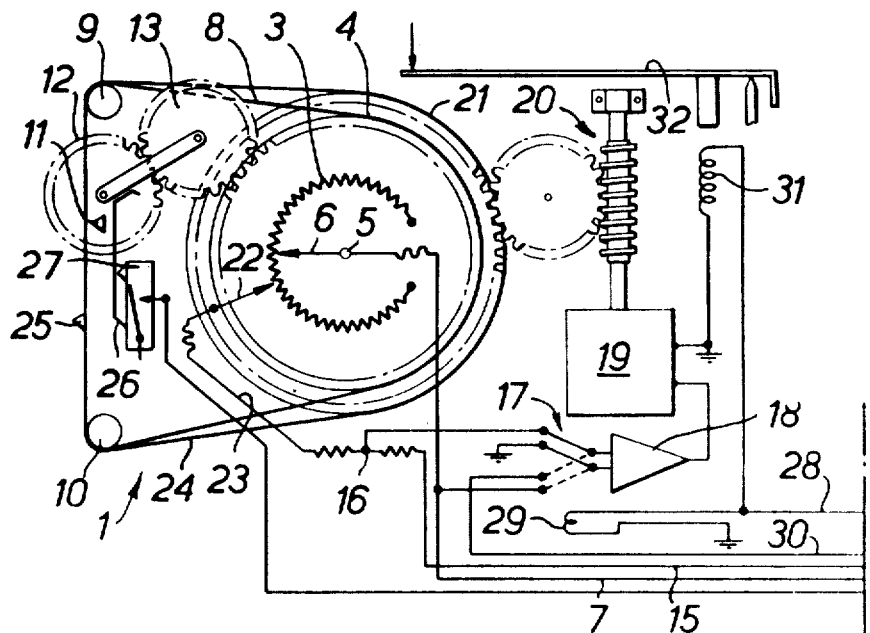
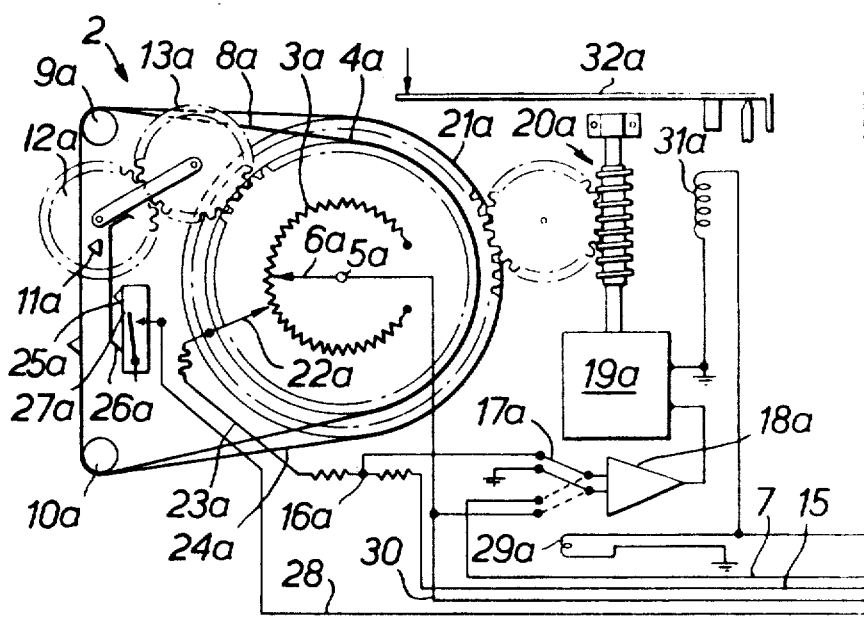
INVENTOR.
BY PETER J. A. TURNER
ATTORNEY.

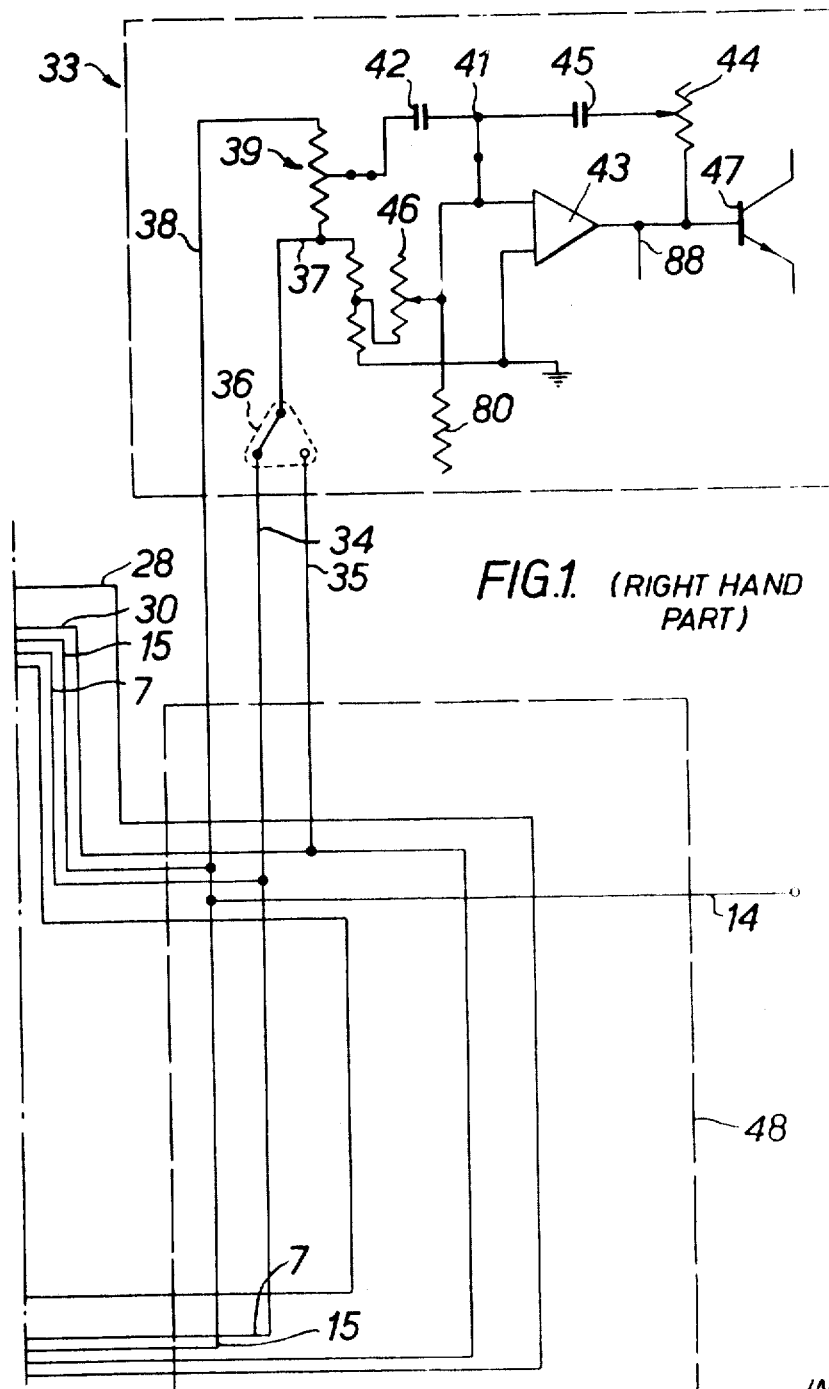
FIG.1. (RIGHT HAND PART)

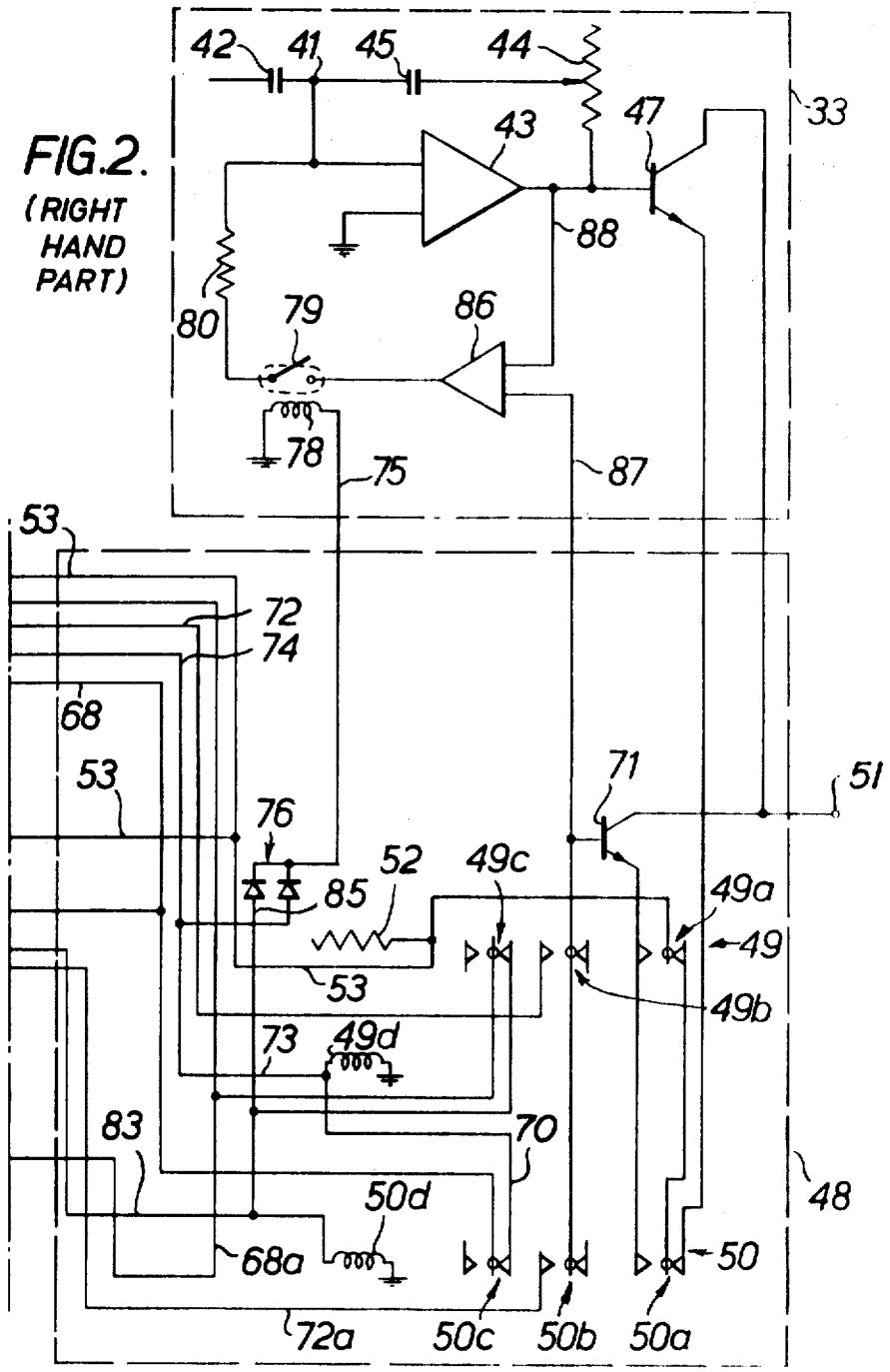

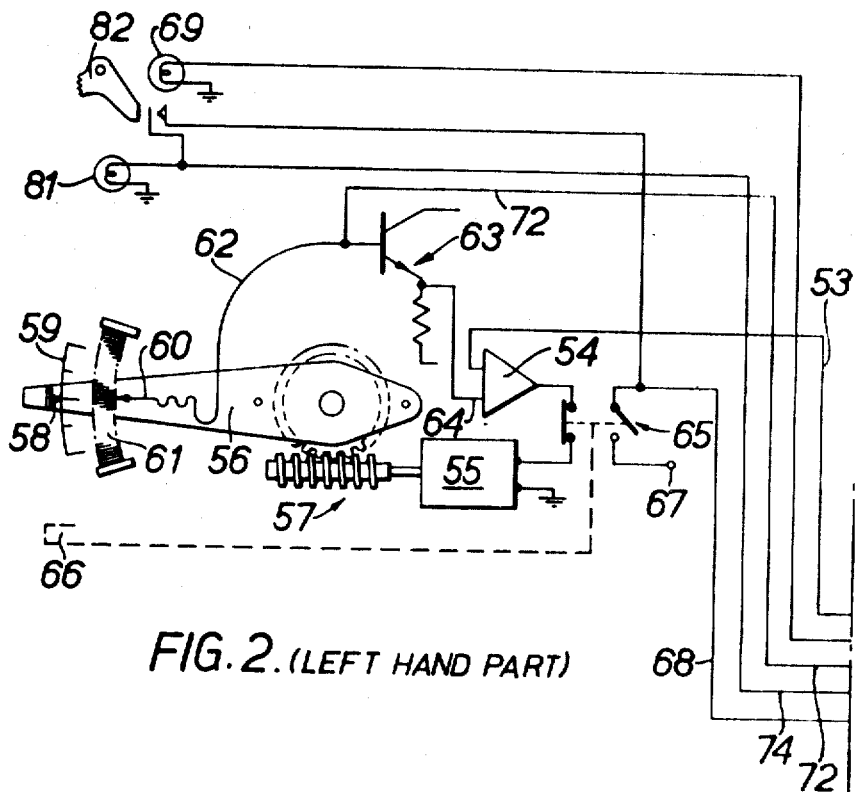
FIG. 2. (LEFT HAND PART)
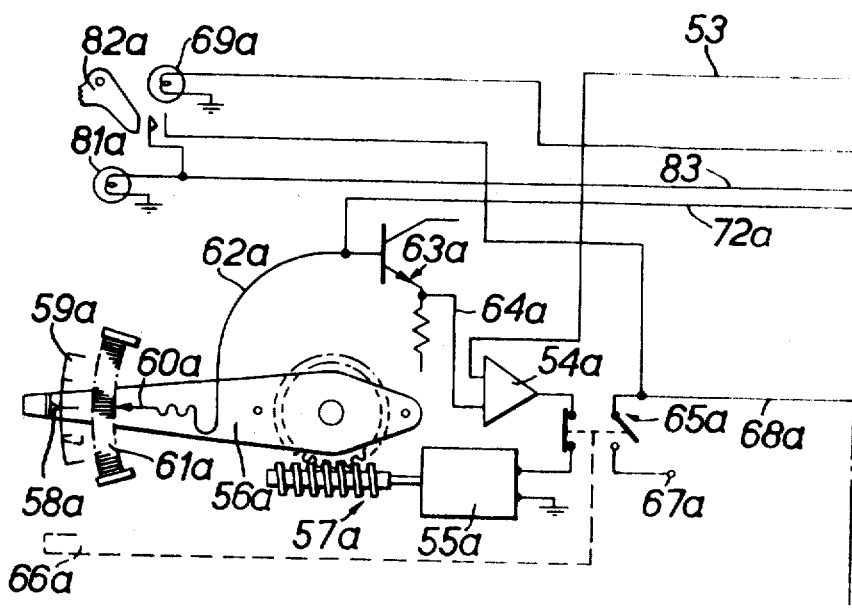

TANDEM CONTROL OF PROCESS CONTROLS SYSTEM HAVING TWO OR MORE CONTROL STATIONS

This invention relates to process control systems.

Generally the objective of such systems is to maintain some process variable, for example, a temperature, a flow rate or a fluid level at a particular required value. In order to do this the value of the process variable is measured by some appropriate form of measuring arrangement which gives as an output an electrical signal which represents the value of the process variable and is referred to as a process variable signal. Within the process control system a set point signal is generated which represents a desired value, or set point, for the process variable. The control system compares the process variable signal with the set point signal and makes adjustments to a final control element, for example, a valve controlling the flow of a heating medium of a process medium, which adjustment are such as tend to eliminate any deviation of the process variable from the set point. The final control element is actuated by a control signal delivered at the output of the process control system. As well as the automatic mode of control, which has just been outlined, it is usual to have an arrangement whereby the control signal can also be manually adjusted so that the process can be manually controlled when required, for instance, when the process is started up or if the automatic control system becomes faulty.

An object of the present invention is to provide a process control system which enables the set point signal to be adjusted from more than one location and presents at each of those locations an indication of the existing value of the set point signal.

A process control signal according to the invention comprises two or more control stations each having an electrical set point signal generator and means for indicating, and manually adjusting, the value of said set point signal, means for causing manual adjustment of the generator at any one of the stations to effect a corresponding adjustment of the generator at each other station whereby the values of the set point signals generated at all the stations are maintained substantially equal, and a control device coupled to the set point signal generator of at least one of the control stations and adapted to provide at a system output a control signal which is dependent upon the value of a process variable signal in relation to the value of the set point signal generated by the control stations.

The control device may be a known form of electrical controller which receives as inputs the set point signal and the process variable signal and produces as an output a control signal which is a function of the difference between them. As is well-known this function may include proportional, reset or rate terms. Although ideally the set point signals generated at each of the stations will be equal, in practice this is difficult to achieve, and so instead of coupling the control device to the set point generators of all the control stations, which would result in the control device receiving a set point signal which is an average of the set point signals developed at the various control stations, it is preferable to couple the control device only to the set point generator of one of the control stations and thereby to avoid the error which might otherwise be produced by the aforementioned averaging effect. A selector switch may be provided by means of which the control device can be coupled to the set point generator of any selected one of the control stations.

Preferably each of the control stations includes a servosystem which, when actuated to do so, will adjust the set point signal generator in such manner as to maintain the value of the set point signal equal to the value of a signal applied at an input to the station, the said input of each station being connected to receive the set point signals of each of the other stations, and each station further includes means which is coupled to the servosystem of each of the other stations and is operable by manual adjustment of the set point signal generator in that station to provide an actuating signal to the servosystem in each of the other stations, whereby when the set point signal generator of any control station is manually adjusted the servosystem of each of the other control stations will be actuated so as to correspondingly adjust the set point signal generator at each of the other stations.

Conveniently each control station will also provide an indication of the existing value of the process variable.

A preferred feature of the invention is that each control station includes an input for said process variable signal, said servosystem being normally coupled to said process variable input and to process variable indicating means, the servosystem being operable by said process variable signal to drive said indicating means so as to indicate the value of the process variable, but which servosystem will, when actuated by adjustment of the set point signal generator of another section, instead correspondingly adjust the set point signal generator of its own station. Thus the servosystem in each control station performs a dual function in that it normally drives a process variable indicator but in addition, whenever the set point is being adjusted from any of the control stations, the servosystems of all the other control stations immediately perform a corresponding adjustment of the set point generators at those stations. When the set point adjustment is finished they return to their original function of operating the process variable indicators.

In a preferred system according to the invention each control station comprises a resistance element which is drivably mounted and to which an electrical potential may be connected, a wiper which is normally driven along said resistance element by the servosystem to continually derive a voltage which will balance the process variable signal, the wiper position thereby representing the value of the process variable, a fixed wiper for deriving from the potentiometer said set point signal, a clutch arrangement which can be actuated by said actuating signal from any other station to complete a driving connection between said servosystem and said resistance element, and switching means is simultaneously actuated by said actuating signal to connect the input of the servosystem to the said set point signal input of the station in place of its normal connections to the process variable signal input to the station. Since the movable wiper position represents the value of the process variable the indication of the process variable is easily achieved by attaching an index directly to the wiper and arranging a suitable calibrated scale to cooperate with the index.

In the preferred embodiment of the invention, in each control station, the means for manually adjusting the value of the said set point signal is manually operable to drive said resistance element and is operatively associated with said means for providing an actuating signal in such manner that no adjustment of the said set point signal can be made until the adjustment means has first been caused to operate the means for providing said actuating signal, whereby the servosystem of each other station is actuated ready to adjust its respective resistance element before the resistance element of the first mentioned station is manually adjusted.

As has already been mentioned, it is usually required that it should be possible to change from automatic control of the process to manual control of the process, that is to say manual control of the control signal being delivered at the system output. It is highly desirable that this change should be a bumpless change, that is to say that upon making the change there should be no sudden accompanying change in the value of the control signal, so as to avoid suddenly disturbing the process being controlled.

From this latter aspect the invention provides a process control system as hereinbefore defined in which each control station comprises a further servosystem having an input coupled to the system output to receive the control signal generated by said control device and a feedback device which is driven to produce at its output a signal which balances the control signal; switching means which is operable to disable the further servosystem and at the same time to connect the feedback device output to the system output, said feedback device being also manually adjustable, whereby upon so operating the switching means the control signal at the system output will not change but can subsequently be changed by manually adjusting the feedback device. It will be appreciated that an index can be attached to the feedback device, which may be for example a potentiometer whose wiper is driven by the servosystem, and that the value of the control signal will be indicated by said index if a suitable scale is provided adjacent to it.

A preferred feature of a process control system, as just referred to, is that the control stations are interconnected by an electrical interlock system which is operable to prevent connection of the feedback device outputs of each other station to the system output while the feedback device output of any one station is connected to the system output, and a control at each control station which is operable to disconnect the feedback device of any other control station from the system output so that simultaneous conflicting manual adjustments of the control signal from different control stations cannot be made.

It will be appreciated from the following description that the present invention also provides a control station having an electrical set point signal generator and means for indicating, and manually adjusting, the value of said set point signal, an input for an external set point signal and means connected to said input for automatically adjusting the set point signal generator to make the set point signal substantially equal to said external set point signal.

Control stations according to the invention preferably comprise an input for an actuating signal, said means being a servosystem which is connected to the actuating signal input and which, when actuated by a signal received at that input will automatically adjust the set point signal generator to make the set point signal substantially equal to an external set point signal.

As will be apparent from the following description the preferred control station, according to the invention, includes an input for a process variable signal, said servosystem being normally coupled to said process variable input and to process variable indicating means, the servosystem being operable by said process variable signal to drive said indicating means so as to indicate the value of said process variable but which servosystem will, when actuated by said actuating signal, instead adjust the set point signal generator to make the set point signal substantially equal to an external set point signal.

A further feature of the preferred control station according to the invention is that it comprises a further servosystem having an input to which a process control signal may be applied and a feedback device which is driven to produce at its output signal which balances the control signal, switching means which is operable to disable the further servosystem and at the same time to connect the feedback device output to an output from the control station, said feedback device being also manually adjustable whereby upon so operating the switching means a signal equal to the control signal will be applied at said control station output and can subsequently be changed by manually adjusting the feedback device.

In order that the invention may be more clearly understood a preferred embodiment in accordance with it will now be described, by way of example, with reference to the accompanying diagrammatic drawings, in which:

FIG. 1 shows the set point signal generators and the means for indicating the value of the process variable at two control stations, and a controller to which the two stations may be selectively connected; and FIG. 2 shows the means for manually adjusting, and for indicating, the value of the control signal at both of the control stations shown in FIG. 1, and also part of the controller which is more fully shown in FIG. 1.

In FIG. 1, the control stations are indicated at 1 and 2 respectively. The two control stations are identical.

Control station 1 includes an electrical set point signal generator constituted by a potentiometer winding 3 one end of which is connected to a source of —5 v. and the other end of which is connected to a source of —1 v. The winding 3 is mounted on an externally toothed wheel 4 which can rotate about a spindle 5. A wiper 6 is fixed to the spindle 5 and makes contact with the potentiometer winding 3. The set point signal is the voltage which is picked off the winding 3 by wiper 6 and applied to a line 7. The value of the set point signal depends on the angular position of the wheel. An indicating tape 8 is wrapped around the wheel 4 and two pulleys 9 and 10. The tape 8 carries calibrations and runs adjacent to a fixed index 11 situated between pulleys 9 and 10 so that the index 11 will indicate upon tape 8 the value of the set point signal.

The value of the set point signal can be manually adjusted by means of a toothed wheel 12 which engages with a further toothed wheel 13 which in turn engages with the toothed wheel 4.

The control station 1 also includes means for indicating the value of a process variable signal which is supplied to the system on a line 14 from a suitable transmitter which in turn is connected to a measuring arrangement which is measuring the value of the process variable. From line 14 the process variable signal is applied along a line 15 to junction 16. Junction 16 is connected through one pole of a double pole, double throw relay 17 to one input of a differential amplifier 18 whose other input is earthed. The output of amplifier 18 drives a motor 19 which drives, through a gear train 20, a wheel 21 carrying a wiper 22 which bears on the potentiometer winding 3. The voltage developed on wiper 22 is fed on a line 23 to the junction point 16. Hence the voltage at junction point 16 which is fed to the amplifier 18 is the difference between the process variable signal and the voltage developed on wiper 22. The arrangement is such that motor 19 is driven in a direction to balance the voltage at wiper 22 against the process variable signal, so it will be appreciated that components 16 to 23 constitute a servosystem which will continually position the wheel 21 in accordance with the value of the process variable signal.

A cord 24 is wrapped around wheel 21 and pulleys (not shown) adjacent pulleys 9 and 10, and carries a process variable index 25. The index 25 is adjacent the set point indicating tape 8 so that its position continually indicates the value of the process variable in relation to the value of the set point.

The servosystem performs a dual function in that as soon as any adjustment of the set point potentiometer 3a at control station 2 is made the servosystem at control station 1 becomes actuated to drive and correspondingly adjust the set point potentiometer 3 at control station 1. The toothed wheel 12a at control station 2 which is used for adjusting the set point signal at control station 2 is so arranged that it cannot be rotated until it has first been depressed. This depression moves the actuator 26a on a switch 27a so as to close the switch and apply a 24 v. signal from a source (not shown) to a line 28. Line 28 thereby energizes a coil 29 of relay 17 at control station 1 and this moves the relay contacts to the positions shown in broken lines where they respectively apply to the two inputs of amplifier 18 the voltage on line 7, which is the set point voltage of control station 1, and the voltage on a line 30 which is the set point voltage developed by wiper 6a in control station 2. Energization of line 28 also energizes a clutch coil 31 in the control station 1, which pulls in a clutch locking lever 32 (shown schematically) thereby locking together the two wheels 4 and 21 so that wheel 4 can now be driven by the servomotor 19.

Once the adjustment wheel 12a at control station 2 has been depressed so as to actuate the servosystem in control system 1 in the manner just described, wheel 12a can be manually turned to move the potentiometer 3a and thereby adjust the set point signal being developed at wiper 6a and applied therefrom to line 30 and hence to one of the inputs of the differential amplifier 18 of the servosystem at control station 1. Consequently as the position of potentiometer winding 3a at control station 2 is adjusted the input to the servosystem of control station 1 will change correspondingly and the servosystem will operate to make a corresponding change in the position of the potentiometer winding 2 at control station 1 whereby the set point signals developed on the wipers 6 and 6a will be kept substantially equal throughout the adjustment. As soon as the adjustment is completed and adjusting wheel 12a is released, switch 27a is thereby opened and the actuating signal is removed from line 28. Consequently relay coils 29 and 31 at control station 1 are deenergized and so the servosystem of control station 1 reverts to its original condition and resumes driving the process variable index 25.

In the control system as shown it is the set point signal from the wiper 6 at control station 1 which is applied to the control device, which latter is shown in FIG. 1 as being an electronic controller indicated generally at 33. This yet point signal is applied to the controller 33 on line 34 which is connected to line 7 leading to the wiper 6. The line 30 which is connected to the wiper 6a of the set point signal generator in control station 2 is connected to line 35 which also leads to the controller 33 but it will be seen that the controller 33 is provided with a selector switch 36 which in the position shown connects the controller set point input line 37 to the set point output line 34 from control station 1, and not to set point output line 35 of the control station 2. However, by operating the selector switch 36 these connections can be reversed as and when required, for instance, if one of the control stations is temporarily out of action due to breakdown or servicing. The controller 33 also receives, as second input signal, the process variable signal which is fed into the controller on line 38 which is connected to line 15 which carries the process variable signal to the two control stations.

The controller 33 itself is basically of a well-known kind and includes an input circuit comprising a resistor chain 39 to one end of which the process variable signal is applied on line 38 and to the other end of which the set point signal is applied on line 37. A deviation signal representing the difference between the process variable and set point signal is taken from the center of the resistor chain 39 on a line 40 and is fed to a junction point 41 through a capacitor 42. Junction point 41 is connected to the input of a control amplifier 43 and a feedback circuit consisting of a proportional band resistor 44 and feedback capacitor 45 feeds a proportion of the control amplifier output back to the junction point 41. In the particular controller illustrated a reset resistor 46 is included so as to provide a reset term in the output of the control amplifier 43, which output is applied to the base of a transistor 47 which regulates the value of a control signal in the form of a control current which is supplied to the final control element, for example to an electric valve actuator.

As is well known such a controller produces an output signal which is related to the error signal in such a way that it will adjust the final control element so as to compensate for the deviation of the value of the process variable from the set point and thereby return the process variable to the set point.

Turning now to FIG. 2, this figure shown two further portions of the control stations 1 and 2, these being the portions which perform the dual function of normally indicating the value of the control signal and also allowing for manual adjustment of the control signal when required.

FIG. 2 also shows a junction box 48 which contains two relays 49 and 50 each having three sets of contacts. The relay contacts are shown in the "automatic" position, that is to say, the position they have when the controller is automatically varying the control signal value in the manner which has already been described.

In FIG. 2 a system output line is shown at 51 which carries the control signal from the control transistor 47 to the final control element. The control signal is derived from a voltage source 52 and flows through relay contacts 49a and 50a before passing through the transistor 47, when the system is in the "automatic" mode.

The control signal, in the form of the voltage on the emitter on the transistor 47, is fed by means of lines 53 to one input of a differential amplifier 54 in control station 1.

Amplifier 54 forms part of a further servosystem in control station 1. This servosystem consisting of a motor 55 driven by the output of amplifier 54, an arm 56 which is driven through a friction drive 57 by the motor 55 and which carries an index 58 cooperating with a scale 59, and which also carries a wiper 60 which can be moved along a feedback element in the form of a potentiometer winding 61. The winding 61 is connected at one end to a source of +4v. and at the other end to a source of −4 v. The wiper 60 is connected by line 62 to an emitter follower circuit 63 whose output is fed to the other input of the differential amplifier 54 on a line 64 so as to complete the servo loop. A double pole single throw switch 65 has one pole connected into the servo loop and the poles of switch 65 are shown in the "automatic" position in FIG. 2, in which position the switch 65 is effective to complete the servo loop. Switch 65 is operated by a manual/auto button 66.

All the above components of control station 1 are present also in control station 2 and it will be appreciated that the further servosystems of the two control stations are effective to continually give an indication of the existing value of the control signal at the scales 59 and 59a so long as the system is in the "automatic" mode.

Assume now that an operator at control station 1 wishes to take manual control of the process by putting the control system into the "manual" mode.

The button 66 is operated to move switch 65 to the "manual" position in which position it disables the further servosystem by breaking the servo loop and also connects a source 67 of 24 v. to a line 68 which leads from the control station 1 to a warning light 69a in control station 2. Line 68 leads also through contacts 50c of a relay 50 to a line 70 which is connected through a coil 49d of relay 49 to earth. Consequently coil 49d is energized and the contacts of relay 49 are moved to their "manual" position. The change in the position of contacts 49a connects a control transistor 71 to the system output line 51 in place of the control transistor 47. The change in position of contacts 49b places the base of the control transistor 71 in connection with a line 72 which is connected by line 62 to the wiper 60 at control station 1. Hence the voltage on wiper 60 is fed to the base of transistor 71 and from there to the system output.

However, the wiper 60 had been tracking the control signal in the "automatic" mode and hence upon the changeover the the "manual" mode the control signal at the system output will not be changed. Therefore the change from "automatic" to "manual" mode is a bumpless change.

The operator at control station 1 can then manually move the arm 56 and thereby adjust the voltage applied to the base of control transistor 71 from wiper 60 on lines 62 and 72 and thereby can manually control the value of the control signal which is being applied to the final control element.

It should also be mentioned that when line 70 became energized upon switching to the "manual" mode it supplied an energizing signal on line 73 to line 74. This energization of line 74 is effective to energize the output line 75 of a diode switching circuit 76, which in turn energizes a coil 78 which closes a contact 79 so as to connect the input of the control amplifier 43 to the output of a comparator circuit 86 through a resistor 80. Energization of line 74 also energizes a light 81 at control station 1 to indicate to the operator that the system is now in the "manual" mode.

It is to be noted that contacts 49a are now connecting the emitter of the control transistor 71 through line 53 to the input of the differential amplifier 54a in the further servosystem of control station 2 so that the index 58a at control station 2 will continue to be driven by its servosystem in correspondence with any manual movement of the index 58 of control station 1. The wiper 60a at control station 2 moves with the index 58a so that the wipers 60 and 60a at the to control stations are maintained in corresponding position throughout any manual adjustment of one or the other of them, by means of the respective servosystem.

If the operator now moves to control station 2 and wishes to resume his manual control of the process from there he will be warned by the illumination of light there he will be warned by the illumination of light 69a that the system is at present in a condition for manual control from control station 1.

In order to transfer the manual control function from station 1 to station 2 without intermediately reverting to automatic control the auto/manual control button 66a is moved into the manual position. Although this energizes line 68a this has no immediate effect because contacts 49c are in the open condition. But if button 82a is momentarily pressed the relay coil 50d will be directly energized by line 83, relay contacts 50c will open and relay 49 will be deenergized, closing contacts 49c to allow relay 50 to remain permanently energized via line 68a to provide manual control from station 2. The auto/manual switch 66 at station 1 is no longer operative and should be returned to the automatic position. At the same time the light 81a at control station 2 is illuminated to indicate that control station 2 can now be used for manual control, and a light 69 at control station 1 is illuminated as a warning that control station 2 is in the manual control condition.

During the transfer the line 75 remains energized from line 83 so that the contact 79 remains closed and the comparator 86 continues to keep the output of amplifier 43 equal to the voltage applied to the base of transistor 71.

It will be appreciated that now the voltage of wiper 60a at control station 2 is being applied through a line 72a and contacts 50b to the base of control transistor 71 so that manual adjustment of the position of the arm 56a and index 58a on control station 2 will cause manual adjustment of the control signal at the system output line 51.

During manual adjustment of the control signal from control station 2 the wiper 60 at control station 1 will be servo driven to keep up with any movements of the wiper 60a at control station 2, provided its further servo system has been reenabled by moving its auto/manual switch 66 back to the "automatic" position.

In order to return the system to the "automatic" mode the operator moves the auto/manual switch 66a to the "automatic" position thereby moving the contacts of switch 65a back into the positions shown in FIG. 2. This deenergizes line 68a and hence also deenergizes the relay coil 50d so that the contacts of relay 50 return to their "automatic" position as shown in FIG. 2 and the controller 33 can then resume automatic control of the process in the manner which has already been described.

The change from "manual" to "automatic" control is also a bumpless change. This is achieved by means of the comparator circuit 86 which acts in the following manner to maintain the output signal of the control amplifier 43 equal to the signal which is being manually applied to the base of control transistor 71, during "manual" operation, and thereby ensures that upon switching to the "automatic" mode the control signal delivered from control transistor 71 will be equal to that previously delivered from control transistor 47 so that no bump will occur on the system output line 51. The comparator circuit 86 has two input lines 87 and 88 which are respectively connected to the base of control transistor 71 and to the output of the control amplifier 43. The comparator circuit 86 continually compares the input signals on the two input lines 87 and 88 and produces an output signal which when applied to the input of control amplifier 43 through contact 79 and resistor 80 is such as to change the output of the control amplifier 43 until the output from the comparator 86 becomes zero. At this point the output signal of the control amplifier 43 is equal to the signal on the base of control transistor 71 and this equality is continually maintained so that a bumpless change from the "manual" to the "automatic" mode can be effected.

In the process control system, as described, adjustments of the set point are made manually at one control station or the other and are transmitted to the other control station where corresponding adjustment is automatically made to the set point signal generator in that control station. However, it is possible for the set point generators of both the control stations to be simultaneously adjusted from an external source by energizing clutch coils 31 and 31a simultaneously and applying an external set point voltage from some external source across the inputs of the amplifiers 18 and 18a. This will cause the motors 19 and 19a to drive the respective wheels 4 and 4a until the set point signals at wipers 6 and 6a are equal to the set point signal which has been fed into the amplifiers 18 and 18a. In this way the set point generators of both the control stations may be periodically and regularly updated from an external source as may be required, for example, in cascade control systems or where the control system is operating under the control of a computer which produces analogue set point signals which are used to update the control stations under its command.

Control stations of the kind which have been described are also particularly suitable for individual use in computerized process control systems since it is easy to arrange for the computer to produce an output signal which will energize the relay coil 29 and clutch coil 31 and then to produce an analog signal which is applied to that terminal of the relay 17 which is shown in FIG. 1 as being connected to line 30 and thereby to drive the set point generator of the control station until the value of its set point signal is equal to that which was fed in by the computer. After the computer signal is removed from relay coil 29 and clutch coil 31 the control station will continue automatic control, through the controller 33, at the updated set point.

Although the control system hereinbefore described includes only two control stations, it will be apparent to those skilled in the art that three or more control stations may e similarly coupled to a single controller.

It will also be apparent that the line connecting each control station into the junction box 48 may be connected by a plug-in connection and then it is possible to have a plurality of controllers 33 each connected through a junction box 48 to a single control station such as control station 1 and then to have a further control station such as control station 2, which may be plugged in at will to any one of the junction boxes 48 so that the effect of each of the controllers 33 may be monitored and manually controlled from the control station 2 by plugging control station 2 into the appropriate junction box 48.

The embodiments of the invention in which an exclusive property or privilege is claimed are defined as follows:

I claim:

1. A process control system, comprising: two or more control stations each having an electrical set point signal generator, means for indicating the value of said set point signal, and means for manually adjusting the value of said generated set point signal; electrical interconnect means for causing manual adjustment of said generated set point signal at any one of said control stations to effect a corresponding adjustment of said generated set point signal at each other control station for maintaining the values of said generated set point signals at all the control stations substantially equal, a control device coupled to the set point signal generator of at least one of said control stations; said control device having a system input and a system output and arranged to provide at said system output a control signal which is dependent upon the value of a process variable signal applied to said system input in relation to the value of said set point signal generated by said control stations.

2. A system according to claim 1 in which said control device is coupled only to the set point signal generator of one of said control stations.

3. A system according to claim 1 comprising a selector switch by means of which said control device can be coupled to the set point signal generator of any selected one of said control stations.

4. A system according to claim 1 in which each of said control stations includes an input from each of the other control stations connected to receive said generated set point signals of each of the other stations; a servosystem which, when actuated to do so, will adjust the set point signal generator in such manner as to maintain the value of said generated set point signal equal to the value of a signal applied at said input to the station; and each station further includes means which is coupled to the servosystem of each of the other stations and is operable by manual adjustment of the yet point signal generator in said station to provide an actuating signal to the servosystems in each of the other stations; whereby when the set point signal generator of any control station is manually adjusted the servosystem of each of each of the other control stations will be actuated so as to correspondingly adjust the set point signal generator at each of the other stations.

5. A system according to claim 4 in which each control station includes an input for said process variable signal connected to said system input; process variable indicating means; said servosystem normally coupled to said input of said process variable and to said process variable indicating means; the servosystem being operable by said process variable signal to drive said process variable indicating means so as to indicate the value of the process variable; and said servosystem, when actuated by adjustment of the set point signal generator of another station, being operable by a signal applied thereto from said other set point signal generator to adjust the set point signal generator of its own station.

6. A system according to claim 5 in which each control station comprises a resistance element which is drivably mounted and to which an electrical potential may be connected, a wiper which is normally driven along said resistance element by the servosystem to continually derive a voltage which will balance said process variable signal, the wiper position thereby representing the value of said process variable, a fixed wiper for deriving from the potentiometer said set point signal, a clutch arrangement which can be actuated by said actuating signal from any other control station to complete a driving connection between said servosystem and said resistance element, and switching means which is simultaneously actuated by said actuating signal to connect the input of the servosystem to the said set point signal input of the station in place of its normal connection to the said process variable signal input to the station.

7. A system according to claim 6 in which in each control station, said means for manually adjusting the value of the said generated set point signal is manually operable to drive said resistance element and is operatively associated with said means for providing an actuating signal in such manner that no adjustment of the said generated set point signal can be made until said means for manually adjusting has first been caused to operate the means for providing said actuating signal, whereby the servosystem of each other control station is actuated ready to adjust its respective resistance element before the resistance element of the first mentioned station is manually adjusted.

8. A system according to claim 1 in which each control station comprises a further servosystem having an input coupled to said system output to receive said control signal generated by said control device and a feedback device which is driven to produce at its output a signal which balances said control signal; switching means which is operable to disable said further servosystem and at the same time to connect said feedback device output to the system output, said feedback device being manually adjustable, whereby upon so operating said switching means the control signal at said system output is unchanged until a subsequent manual adjustment of said feedback device.

9. A system according to claim 8 in which said control stations further comprise an electrical interlock system interconnecting said control stations which is operable to prevent connection of said feedback device outputs of each other station to the system output while the feedback device output of any one station is connected to the system output, and a control means at each control station which is operable to disconnect said feedback device of any other control station from the system output so that simultaneous conflicting manual adjustments of the control signal from different control stations cannot be made.

10. A control station having an electrical set point signal generator, means for indicating the value of said generated set point signal, means for manually adjusting the value of said generated set point signal, an input for an externally generated set point signal, and means connected to said input for automatically adjusting the set point signal generator to make said generated set point signal substantially equal to said externally generated set point signal.

11. A control station according to claim 10 comprising an input for an actuating signal, said means for automatically adjusting the yet point signal generator being a servosystem which is connected to the actuating signal input and which, when actuated by a signal received at that input will automatically adjust said set point signal generator to make the set point signal substantially equal to an external set point signal.

12. A control station according to claim 11 which includes an input for a process variable signal, process variable indicating means, said servosystem normally coupled to said input for said process variable and to said process variable indicating means, the servosystem being operable by said process variable signal to drive said process variable indicating means so as to indicate the value of said process variable, and said servosystem, when actuated by said actuating signal, operable instead to adjust the set point signal generator to make the set point signal substantially equal to an external set point signal.

13. A control station according to claim 10 which comprises an output, a further servosystem having an input to which a control signal may be applied and a feedback device which s driven to produce at its output a signal which balances said control signal, switching means which is operable to disable said further servosystem and at the same time to connect said feedback device output to said output from the control station, said feedback device being manually adjustable, whereby upon so operating said switching means a signal equal to the control signal will be applied at said control station output and can subsequently be changed by manually adjusting the feedback device.